United States Patent
Kim et al.

(10) Patent No.: US 8,980,457 B2
(45) Date of Patent: Mar. 17, 2015

(54) BATTERY MODULE

(75) Inventors: Myung-Chul Kim, Yongin-si (KR); Seung-Woo Yang, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 0 days.

(21) Appl. No.: 13/243,618

(22) Filed: Sep. 23, 2011

(65) Prior Publication Data

US 2012/0114992 A1    May 10, 2012

(30) Foreign Application Priority Data

Nov. 4, 2010  (KR) .................. 10-2010-0109180

(51) Int. Cl.
| | |
|---|---|
| H01M 2/12 | (2006.01) |
| H01M 2/10 | (2006.01) |
| H01M 2/04 | (2006.01) |
| H01M 2/34 | (2006.01) |
| H01M 2/20 | (2006.01) |

(52) U.S. Cl.
CPC .............. *H01M 2/1077* (2013.01); *H01M 2/04* (2013.01); *H01M 2/34* (2013.01); *H01M 2/12* (2013.01); *H01M 2/206* (2013.01)
USPC .............................................. 429/83; 429/82

(58) Field of Classification Search
CPC .......................... H01M 2/1016; H01M 2/1061
USPC ........................................................ 429/53, 54
See application file for complete search history.

(56) References Cited

U.S. PATENT DOCUMENTS

| | | | |
|---|---|---|---|
| 5,436,089 A * | 7/1995 | Fedele .......................... | 429/156 |
| 6,790,554 B2 | 9/2004 | May et al. | |
| 7,332,244 B2 | 2/2008 | Uemoto et al. | |
| 7,820,322 B2 | 10/2010 | Jung et al. | |
| 8,039,141 B2 | 10/2011 | Jeon et al. | |
| 8,623,536 B2 | 1/2014 | Jeon et al. | |
| 2001/0004200 A1* | 6/2001 | Sakaue et al. ................. | 320/107 |
| 2004/0013936 A1* | 1/2004 | Barrett, Jr. ...................... | 429/71 |
| 2005/0202315 A1 | 9/2005 | Sugeno et al. | |
| 2006/0073375 A1* | 4/2006 | Hong et al. ..................... | 429/53 |
| 2006/0093899 A1 | 5/2006 | Jeon et al. | |

(Continued)

FOREIGN PATENT DOCUMENTS

| | | |
|---|---|---|
| KR | 1999-018295 | 3/1999 |
| KR | 10-2006-0099216 | 9/2006 |

(Continued)

OTHER PUBLICATIONS

U.S. Office Action dated Nov. 6, 2013 for cross reference U.S. Appl. No. 13/243,355 (17 pages).

(Continued)

*Primary Examiner* — Ula C. Ruddock
*Assistant Examiner* — Scott J Chmielecki
(74) *Attorney, Agent, or Firm* — Christie, Parker & Hale, LLP

(57) ABSTRACT

A battery module including a plurality of battery cells each having a terminal surface accommodating at least one electrode terminal and a vent, and a bottom surface generally opposite from the terminal surface; and an end plate on the terminal surface of each of the battery cells, the end plate having an exhausting hole generally corresponding to the vent and a guide unit covering a portion of the exhausting hole.

12 Claims, 8 Drawing Sheets

(56) References Cited

U.S. PATENT DOCUMENTS

| | | | |
|---|---|---|---|
| 2006/0115719 A1 | 6/2006 | Jeon et al. | |
| 2006/0216579 A1 | 9/2006 | Cho | |
| 2007/0020516 A1 | 1/2007 | Yoon | |
| 2007/0134524 A1 | 6/2007 | Cho et al. | |
| 2009/0017366 A1* | 1/2009 | Wood et al. | 429/62 |
| 2009/0061301 A1 | 3/2009 | Planck | |
| 2009/0155675 A1 | 6/2009 | Houchin-Miller | |
| 2010/0047682 A1 | 2/2010 | Houchin-Miller et al. | |
| 2010/0173181 A1* | 7/2010 | Okada | 429/53 |
| 2011/0151299 A1 | 6/2011 | Park et al. | |
| 2011/0318625 A1 | 12/2011 | Yajima et al. | |
| 2012/0115011 A1 | 5/2012 | Kim | |

FOREIGN PATENT DOCUMENTS

| | | |
|---|---|---|
| KR | 10-2006-0102852 | 9/2006 |
| KR | 10-2006-0116424 | 11/2006 |
| KR | 10-2006-0131320 | 12/2006 |
| KR | 10-0709261 B1 | 4/2007 |
| KR | 10-2007-0068608 | 7/2007 |
| KR | 10-2008-0042965 | 5/2008 |
| WO | WO 2007/011144 A1 | 1/2007 |
| WO | WO 2008/027343 A1 | 3/2008 |
| WO | WO 2010/111647 A2 | 9/2010 |

OTHER PUBLICATIONS

U.S. Office Action dated Nov. 6, 2013 for cross reference U.S. Appl. No. 13/241,522 (10 pages).

U.S. Office action dated May 12, 2014, issued to cross reference U.S. Appl. No. 13/243,355, (12 pages).

EPO Search Report dated Feb. 17, 2014, for corresponding European Patent application 1187693.4, (5 pages).

EPO Office action dated Apr. 15, 2014, for European Patent application 1187704.9, (5 pages).

* cited by examiner

BATTERY MODULE

CROSS-REFERENCE TO RELATED APPLICATION

This application claims priority to and the benefit of Korean Patent Application No. 10-2010-0109180, filed on Nov. 4, 2010, in the Korean Intellectual Property Office, the entire content of which is incorporated herein by reference.

BACKGROUND

1. Field

An embodiment of the present invention relates to a battery module.

2. Description of Related Art

In general, a secondary battery may be re-used through discharging and recharging, unlike a primary battery that may not be recharged. The secondary battery is used as the energy source of a mobile apparatus, an electric vehicle, a hybrid vehicle, an electric bicycle, and as an uninterruptible power supply. In accordance with the type of an applied external apparatus, a single battery may be used or a battery module in which a plurality of batteries are coupled to each other may be used.

A small mobile apparatus such as a cellular phone may be operated for a period of time with the output and capacity of a single battery. However, electric vehicles and hybrid vehicles having a large power consumption when they are driven for a long time have improved performance using a battery module due to the output and capacity of the battery module. A battery module includes a number of serially coupled batteries and may include batteries coupled in parallel in accordance with the output and the capacity required.

SUMMARY

Embodiments of the present invention provide a battery module capable of discharging the gas generated during the operation of battery cells from vents while minimizing the influence of the gas on the battery components.

According to an embodiment of the present invention, a battery module is provided including a plurality of battery cells each having a terminal surface accommodating at least one electrode terminal and a vent and a bottom surface generally opposite from the terminal surface; and an end plate on the terminal surface of each of the battery cells, the terminal surface having an exhausting hole generally corresponding to the vent and a guide unit covering a portion of the exhausting hole.

In one embodiment, at least two of the battery cells are laminated together. Further, the battery cells may be coupled so that the bottom surface of adjacent ones of the battery cells face each other to form a pair of battery cells and a plurality of the pair of battery cells may be stacked together in a battery array, wherein the end plate is located adjacent to the terminal surface of each of the battery cells of the battery array, and wherein fixing members are coupled to the end plate to fix together the battery cells of the battery array.

In one embodiment, the guide unit is inclined away from the exhausting hole. Further, in one embodiment, the exhausting hole comprises a first exhausting hole configured to exhaust gas in a first direction and a second exhausting hole configured to exhaust gas in a second direction substantially opposite to the first direction or in a direction substantially the same as the first direction.

In one embodiment, the end plate includes an extending unit extending from a body of the end plate, wherein the extending unit has a recess substantially aligned with the exhausting hole. Further, the extending unit may have an opening configured to receive a fastener.

The battery module according to the present invention may stably discharge the gas from the battery cells while preventing secondary damage from being applied to the other components such as an adjacent battery module.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE EMBODIMENTS

Figure 1A:
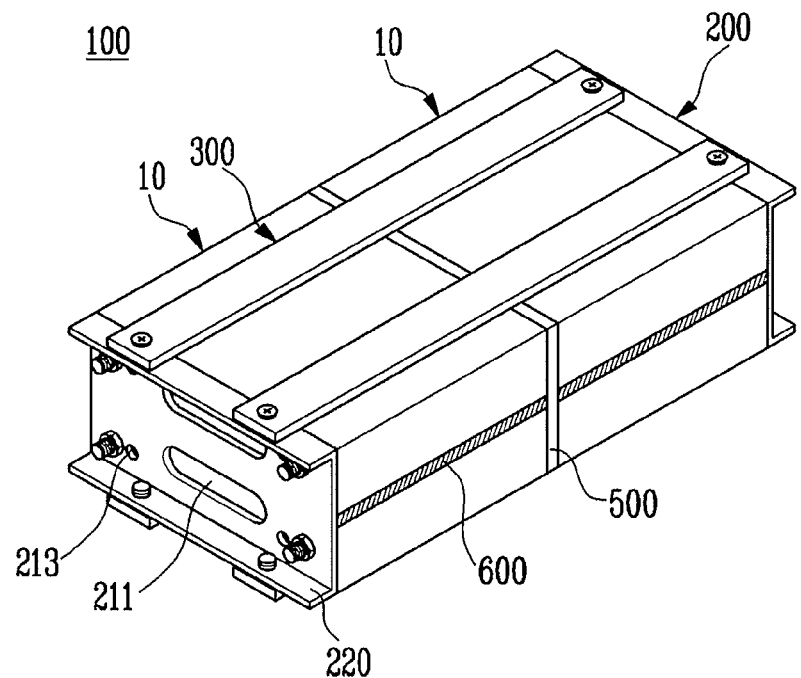
FIGS. 1A and 1B are perspective views illustrating exemplary embodiments of a horizontal arrangement type battery module.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the element or be indirectly on the element with one or more intervening elements interposed therebetween. Also, when an element is referred to as being "connected to" another element, it can be directly connected to the element or be indirectly connected to the element with one or more intervening elements interposed therebetween. Hereinafter, like reference numerals refer to like elements.

Hereinafter, the embodiments of the present invention will be described with reference to the attached drawings. When there is no special definition or comment, the terms for representing directions such as 'up and down and left and right' are based on the state displayed on the drawing. In addition, the same members are denoted by the same reference numerals.

Additionally, hereinafter, a battery array refers to a plurality of accumulated or arranged battery cells.

Figure 1B:
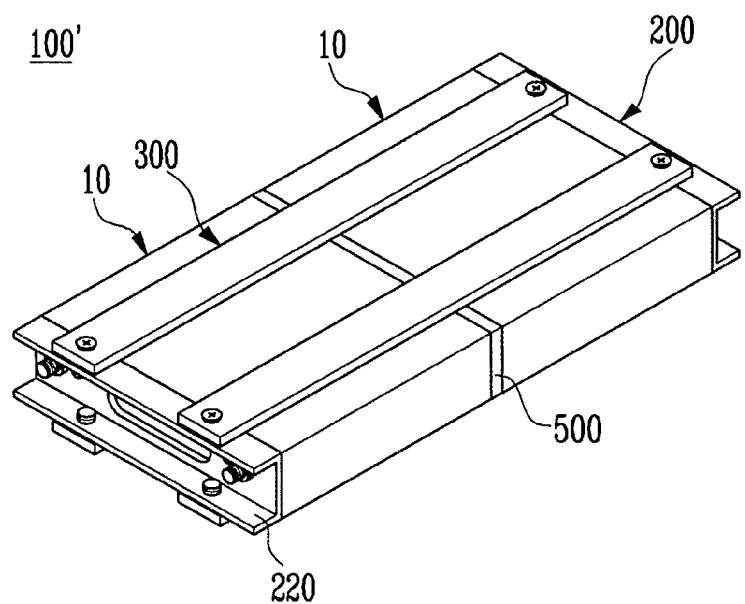
Figure 2A:
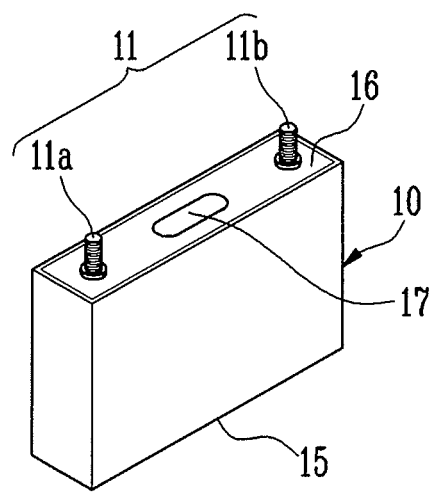
FIG. 2A is a perspective view illustrating the shape of a battery cell.
Figure 2B:
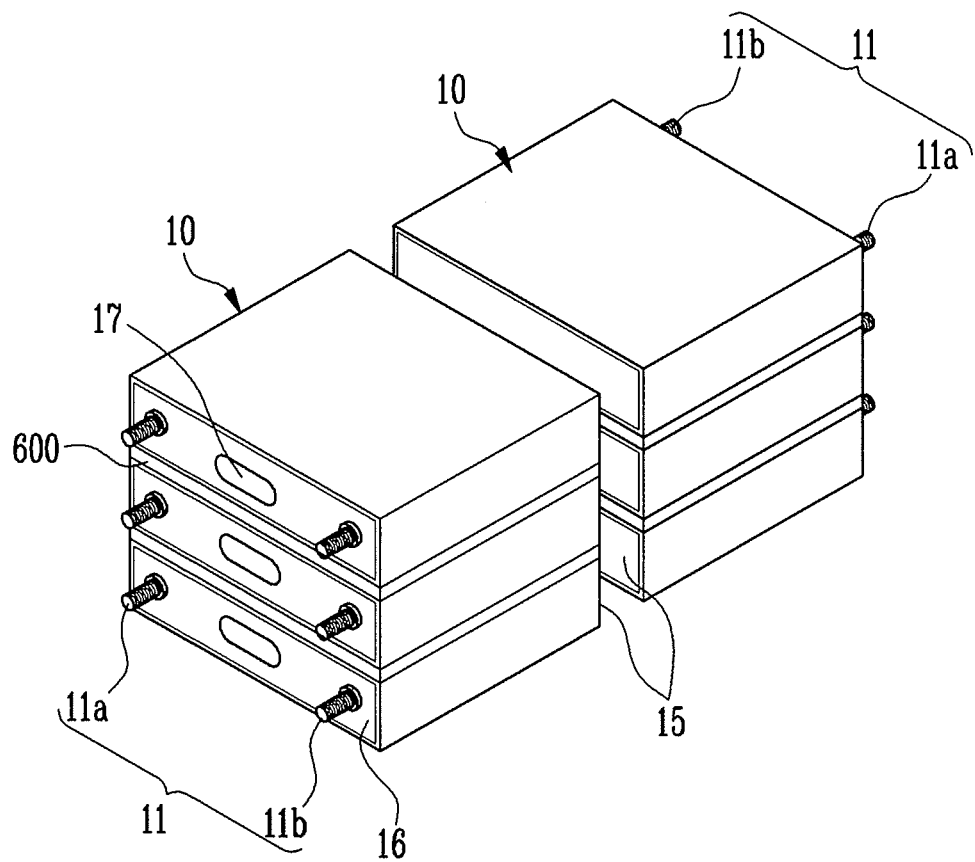
FIG. 2B is a perspective view illustrating an embodiment of a battery array in which battery cells are arranged and accumulated.

Referring to FIGS. 1A to 2B, the type and structure of a battery module 100 or 100' according to the present invention will be simply described. FIGS. 1A and 1B are perspective views illustrating exemplary embodiments of a horizontal arrangement type battery module. FIG. 2A is a perspective view illustrating the shape of a battery. FIG. 2B is a perspective view illustrating an example of a battery array in which battery cells are arranged and accumulated.

The present invention may be applied to the horizontal arrangement type battery module 100 or 100' illustrated in FIG. 1A or 1B. The horizontal arrangement type battery module 100 or 100' may be divided into a plurality of battery cells 10 that constitute a battery array, a structure for insulation, and a structure for fixation.

The battery cell 10 according to the present invention may be hexahedral as illustrated in FIG. 2A. Electrode terminals 11 (a positive terminal 11b and a negative terminal 11a) and a vent 17 are provided on a terminal surface 16. The vent 17 is formed generally in the center of the terminal surface 16 and is configured to discharge the gas generated by the battery cell 10. The electrode terminals 11 are provided on both sides of the vent 17 and function as paths through which the current generated by the battery cell 10 is coupled to an external device. In addition, hereinafter, the opposite side of the terminal surface is referred to as a bottom surface 15.

The battery cell 10 may be used alone or as a battery array formed by laminating the battery cells 10. However, laminating the two battery cells 10 to form one layer is advantageous for space efficiency. As illustrated in FIG. 1B, the two battery cells 10 are horizontally arranged so that the bottom surfaces 15 face each other and so that the electrode terminals 11 are arranged to face outward. The pair of arranged battery cells 10 are laminated to form no fewer than two layers as illustrated in FIG. 2B. However, the present invention may be applied when the battery cells 10 form a single layer or a plurality of layers. However, the present invention is not limited to the configurations described above.

With reference again to FIGS. 1A and 1B, the structure for fixation includes top and bottom fixing members 300 and end plates 200. The top and bottom fixing member 300 are fixed to the top and bottom ends of the end plates 200 to limit the up and down motion of battery cells in the battery array 10. A vertical insulating member 500 and a horizontal insulating member 600 may be provided as insulating members. The vertical insulating member 500 is provided between the bottom surfaces 15 of the two battery cells 10 that face each other for insulation between those surfaces. The horizontal insulating member 600 is provided the two laminated battery cells 10 for insulation between adjacent battery cells.

According to the present invention, an end plate 200a will be described in detail.

Figure 3:
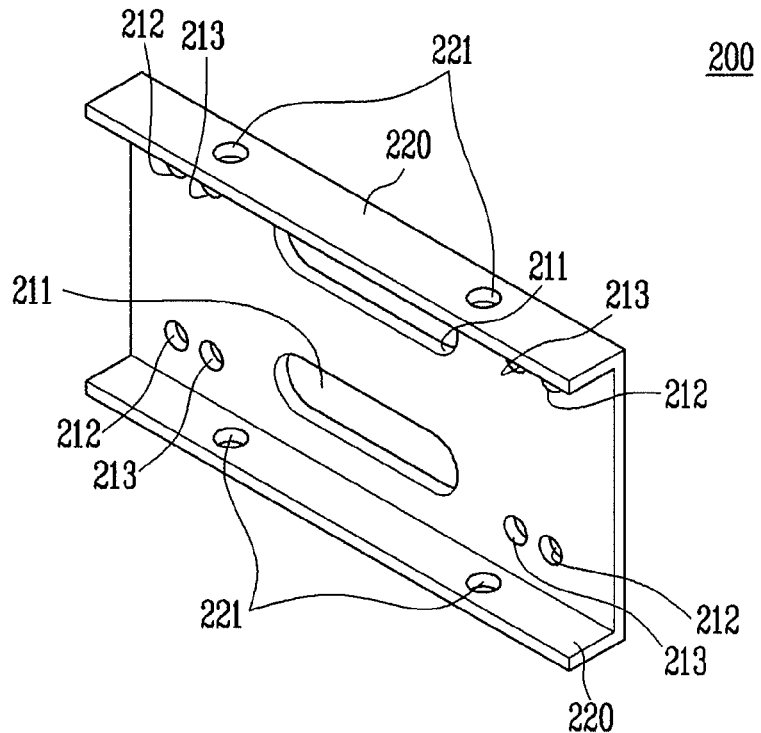
FIG. 3 is a perspective view illustrating a comparative example of an end plate.
Figure 4A:
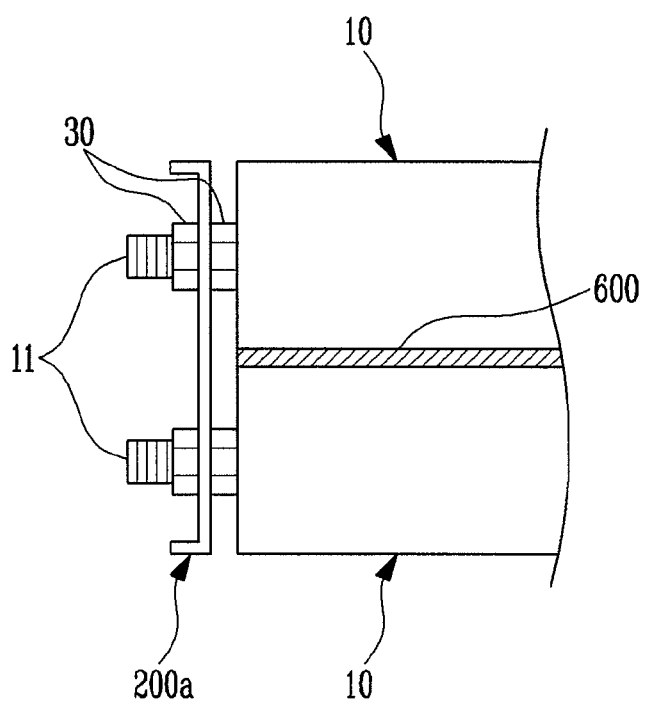
FIG. 4A is a partial side view illustrating a battery cell and an end plate that are coupled to each other.
Figure 4B:
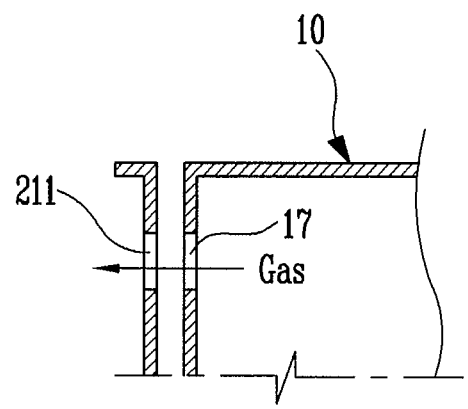
FIG. 4B is a schematic diagram illustrating the flow of a gas through the battery cell and the end plate.

An end plate according to a comparative example will be described with reference to FIGS. 3 to 4B. FIG. 3 is a perspective view illustrating a comparative example of the end plate. FIG. 4A is a partial side view illustrating that the battery cell and the end plate are coupled to each other. FIG. 4B is a schematic diagram illustrating the flow of a gas through the battery cell and the end plate.

The end plate 200a is a fixing member for fixing the above-described laminated battery cells 10. According to the present embodiment, an end plate 200 used for a horizontal arrangement battery module laminated in two layers will be described.

A pair of first fastening holes 221 for performing fastening by a screw method are formed in each of the upper and lower ends of the end plate 200a. First extending units 220 extending at a right angle from the upper and lower ends of the end plate 200a may be further formed to accommodate the first fastening holes 221, which penetrate the first extending units 220.

In addition, exhausting holes 211 are formed in the upper and lower centers of the end plate 200 and have shapes generally corresponding to the above-described vents 17 and are located in generally corresponding positions.

In addition, electrode holes 212 are formed on both sides of the exhausting holes 211. According to the present embodiment, in the case of the battery module laminated in two layers, four electrode holes 212 are provided. As illustrated in FIG. 4A, the electrode terminals 11 of the battery cell 10 are exposed through the electrode holes 212. At this time, male screws are processed on the outer circumference of the electrode terminals 11 and both sides of the end plate 200 are tightened by nuts to fix the battery cells 10 and the end plates 200 to each other.

Additionally, probe holes 213 may be formed between the electrode holes 212 and the exhausting holes 211. Probe units of various apparatuses may be inserted through the probe holes 213 in order to test the voltages of the battery cells of the battery module.

When the battery cells 10 operate, gas may be generated and discharged through the vents 17. In the case of a comparative example, the gas is discharged through the exhausting holes 211 without a change in a direction. However, when a large number of battery cells 10 or battery modules are to be provided in a limited space such as an electric vehicle, a space between the battery cells 10 or the battery modules is minimal. Therefore, when a certain battery cell 10 is malfunctioning and discharging a high temperature gas, the discharged gas may cause an adjacent or proximate battery cell 10 to explode.

Figure 5A:
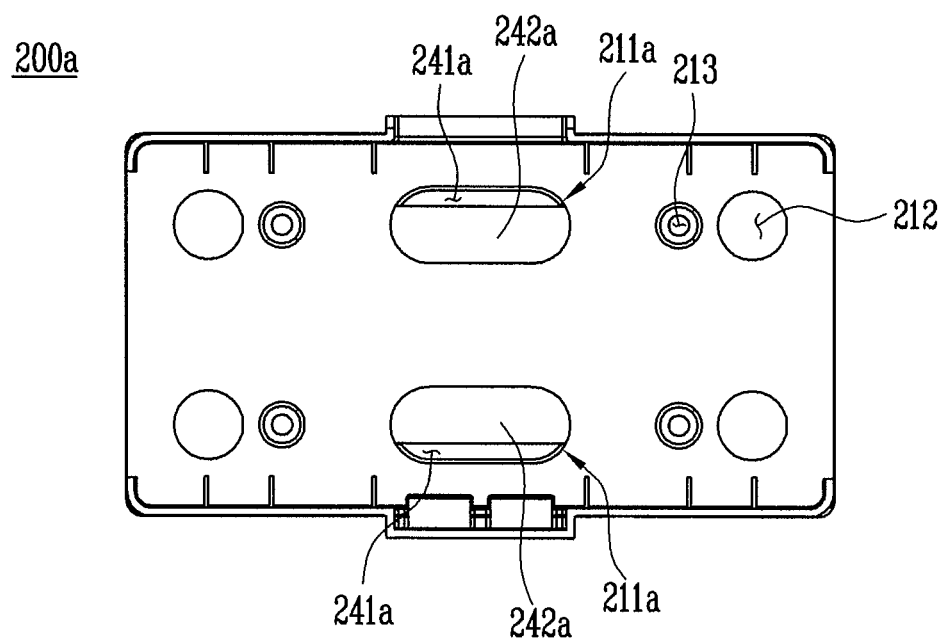
FIG. 5A is a front view illustrating the shape of an end plate according to an embodiment of the present invention.
Figure 5B:
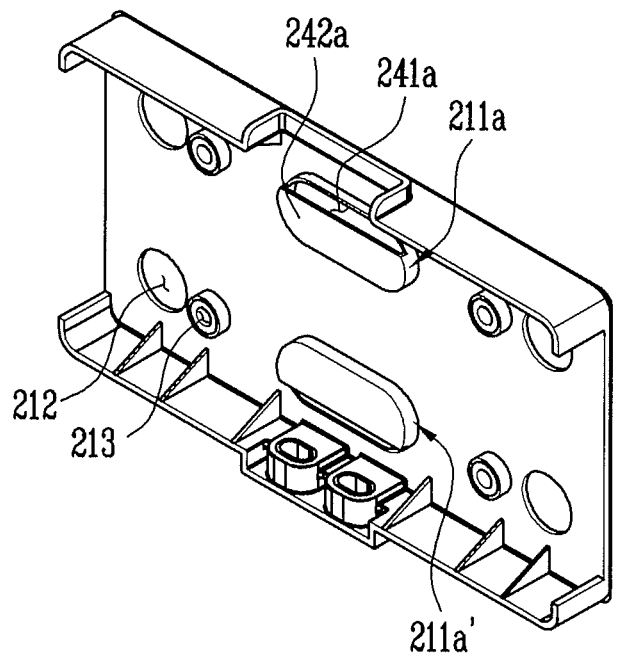
FIG. 5B is a perspective view illustrating the shape of the end plate of FIG. 5A.
Figure 5C:
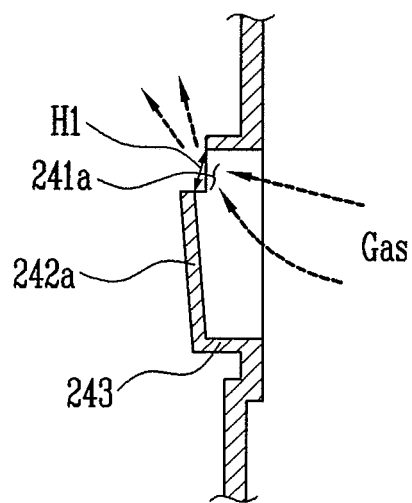
FIG. 5C is a partial sectional view illustrating the exhausting unit of FIG. 5A.
Figure 5D:
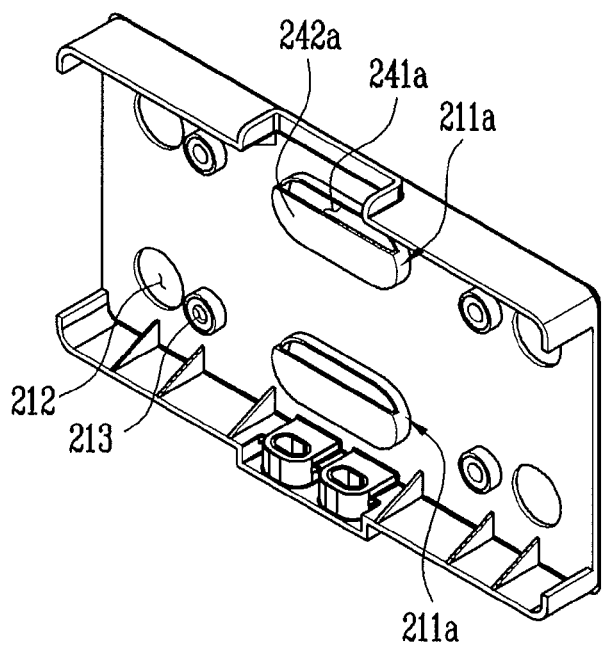
FIG. 5D is a perspective view illustrating the shape of an end plate according to another embodiment.

An end plate according to an embodiment of the present invention will be described with reference to FIGS. 5A to 5D. FIG. 5A is a front view illustrating the shape of the end plate according to the embodiment. FIG. 5B is a perspective view illustrating the shape of the end plate of FIG. 5A. FIG. 5C is a partial sectional view illustrating the exhausting unit of FIG. 5A. FIG. 5D is a perspective view illustrating the shape of an end plate according to another embodiment.

An end plate 200a according to the present embodiment has an exhausting unit 211a. As illustrated in FIG. 5A, the exhausting unit 211a is formed so that at least a portion of the exhausting unit 211a is covered with a guide unit 242a. In one embodiment, the guide unit 242a covers most of the exhausting unit 211a so that an opening 241a is formed on only the upper or lower portion. As such, the flow of the gas is oriented in accordance with the direction of the opening 241a. Therefore, as illustrated in FIG. 5A, when the opening is formed in the upper part, the gas flows upward while passing through the opening 241a. To the contrary, when the opening 241a is formed in the lower part, the gas is discharged downward.

In order to have the gas flow smoothly, as illustrated in FIG. 5C, the guide unit 242a may be formed to be inclined. More specifically, the guide unit 242a may be formed to be inclined from the opening 241a away from the end plate 200a (i.e., away from a base surface of the exhausting unit 211a) so that the flow of the gas towards the opening 241a may be smoothly changed toward the opening 241a. In addition, an exhaust extending unit 243 may be formed to extend from the end plate 200a along the periphery of the exhausting unit 211a.

The structure of the end plate 200a excluding the electrode holes 212 and the probe holes 213 may be the same as the comparative example.

On the other hand, as illustrated in FIG. 5D, the openings 241a may be formed in the upper portion of the upper and lower exhausting units 211a. In this case, since the gas discharged from the battery cells may be concentrated upward, a part of the center of the upper end of an end plate 200a' may be omitted or recessed to form a discharge channel for the gas.

Figure 6A:
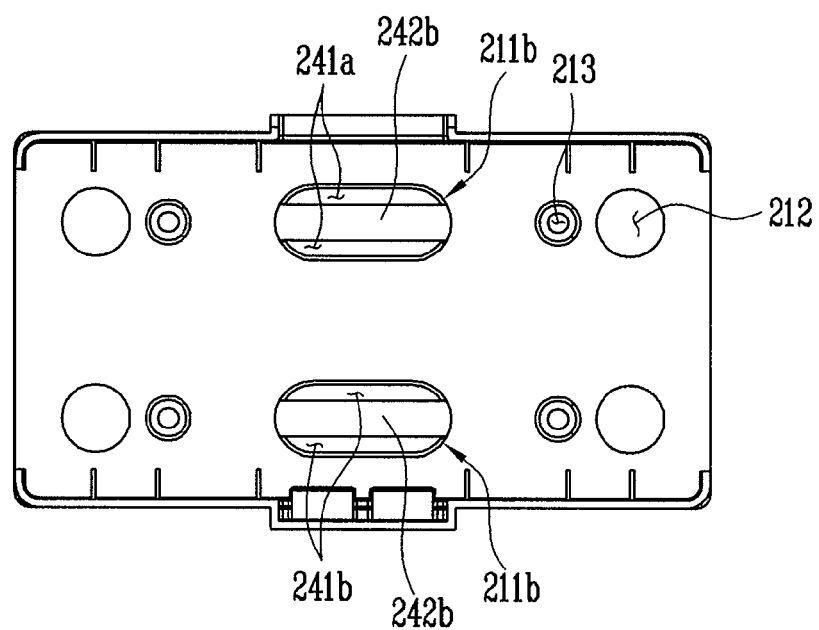
FIG. 6A is a front view illustrating the shape of an end plate according to still another embodiment.
Figure 6B:
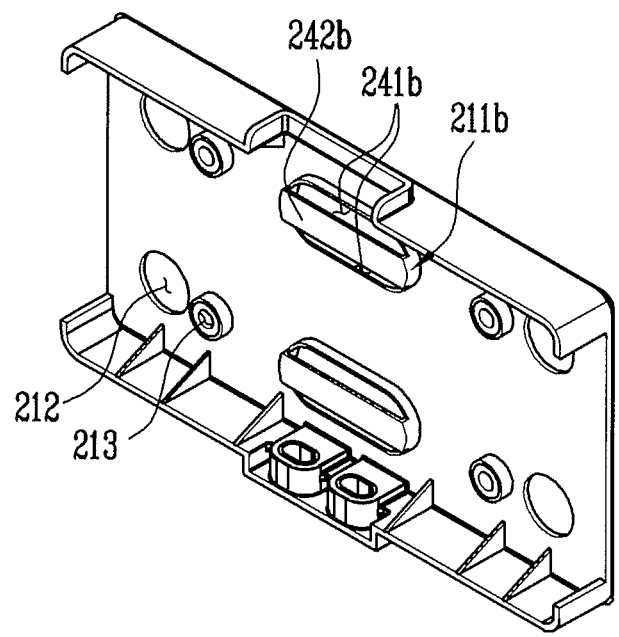
FIG. 6B is a perspective view illustrating the shape of the end plate of FIG. 6A.
Figure 6C:
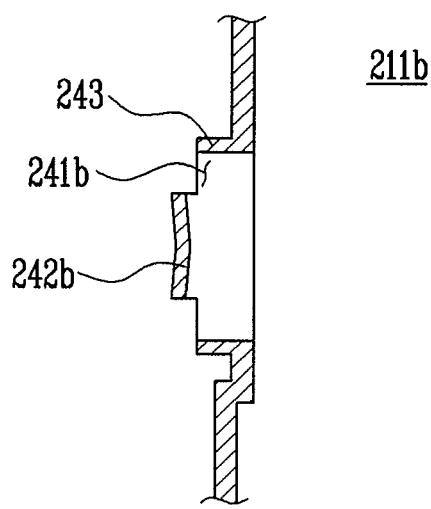
FIG. 6C is a partial sectional view illustrating the exhausting unit of FIG. 6A.

An end plate according to still another embodiment of the present invention will be described with reference to FIGS. 6A to 6C. FIG. 6A is a front view illustrating the shape of an end plate according to still another embodiment of the present invention. FIG. 6B is a perspective view illustrating the shape of the end plate of FIG. 6A. FIG. 6C is a partial sectional view illustrating the exhausting unit of FIG. 6A.

Openings 241a are formed in the upper and low parts of the exhausting unit 211b of the end plate 200b illustrated in FIG. 6A. In this case, the channel of the gas is not as concentrated in comparison with the case in which only one opening 241a is formed. As such, the gas is easily discharged, as illustrated in FIG. 6C, through the openings 241b formed in the upper and lower parts of a guide unit 242b.

Figure 7:
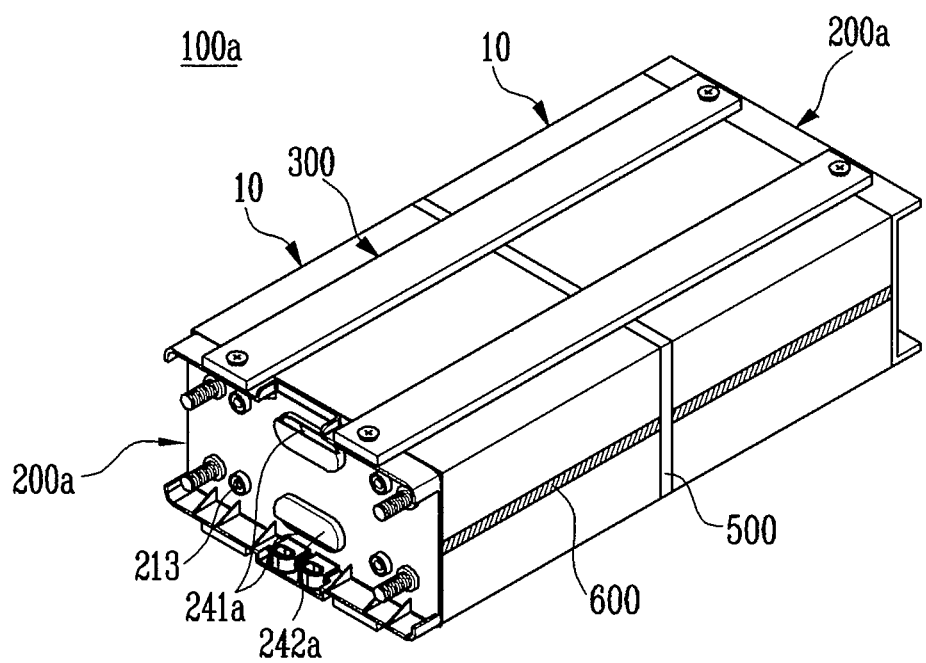
FIG. 7 is a perspective view illustrating a battery module including an exhausting unit according to an embodiment of the present invention.

An example of a battery module according to the present invention will be described with reference to FIG. 7. FIG. 7 is a perspective view illustrating the shape of the battery module including the exhausting unit according to an embodiment.

As described above, the end plates 200a according to the present invention may be provided at both ends of the battery module 100a. The plurality of battery modules 100a are provided so that the gas generated by the battery cells 10 while being operated in a limited space such as an electric vehicle may be discharged. The direction of the discharged gas is changed into upward and/or downward direction through the openings 241a so that the discharged gas is discharged to the outside of the battery module 100a. As a result, it is possible to prevent a high temperature gas from being directly discharged to another battery module 100a adjacent to the terminal surface of the battery module 100a and therefore to prevent the battery module 100a from exploding or being easily damaged.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
    a plurality of battery cells each having a terminal surface accommodating at least one electrode terminal and a vent, and a bottom surface generally opposite from the terminal surface, wherein the battery cells are coupled so that the bottom surface of adjacent ones of the battery cells face each other to form a pair of battery cells and wherein a plurality of the pair of battery cells are stacked together in a battery array; and
    an end plate on the terminal surface of each of the battery cells, the end plate including a surface having an exhausting hole generally corresponding to the vent and a guide unit protruding from the surface of the end plate, wherein the guide unit extends around a portion of a periphery of the exhausting hole and covers only a portion thereof, wherein the end plate is located adjacent to the terminal surface of each of the battery cells of the battery array, and wherein fixing members are coupled to the end plate to fix together the battery cells of the battery array.

2. The battery module as claimed in claim 1, wherein at least two of the battery cells are laminated together.

3. The battery module as claimed in claim 1, wherein the guide unit is inclined away from the exhausting hole.

4. The battery module as claimed in claim 1, wherein the exhausting hole comprises a first exhausting hole configured to exhaust gas in a first direction and a second exhausting hole configured to exhaust gas in a second direction substantially opposite to the first direction.

5. The battery module as claimed in claim 1, wherein the exhausting hole comprises a first exhausting hole having a bottom portion covered by a first guide unit and a second exhausting hole having a top portion covered by a second guide unit.

6. The battery module as claimed in claim 1, wherein the exhausting hole comprises a first exhausting hole having a bottom portion covered by a first guide unit and a second exhausting hole having a bottom portion covered by a second guide unit.

7. The battery module as claimed in claim 1, wherein the end plate comprises an extending unit extending from the end plate, and
    wherein the extending unit has a recess substantially aligned with the exhausting hole.

8. The battery module as claimed in claim 7, wherein the extending unit has an opening configured to receive a fastener.

9. The battery module as claimed in claim 1, wherein the exhausting hole is generally ovular.

10. The battery module as claimed in claim 1, wherein an exhaust extending unit extends from the end plate and supports the guide unit.

11. The battery module as claimed in claim 1, wherein end plate includes an electrode hole through which the electrode terminal is exposed.

12. The battery module as claimed in claim 1, wherein the plurality of battery cells are arranged in a horizontal direction and the guide unit is configured to change a direction of discharged gas.

* * * * *